(12) United States Patent
Frank et al.

(10) Patent No.: US 6,782,511 B1
(45) Date of Patent: Aug. 24, 2004

(54) BEHAVIORAL-SYNTHESIS ELECTRONIC DESIGN AUTOMATION TOOL BUSINESS-TO-BUSINESS APPLICATION SERVICE PROVIDER

(75) Inventors: Elof Frank, Sunnyvale, CA (US); Bernd Braune, Menlo Park, CA (US); David Knapp, San Jose, CA (US); Pradeep Fernandes, San Jose, CA (US); Hans-Joachim Schmidt, Munich (DE)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/579,825

(22) Filed: May 25, 2000

Related U.S. Application Data

(60) Provisional application No. 60/136,127, filed on May 26, 1999, provisional application No. 60/135,902, filed on May 26, 1999, and provisional application No. 60/136,126, filed on May 26, 1999.

(51) Int. Cl.⁷ .............................................. G06F 17/50
(52) U.S. Cl. ................................ 716/1; 716/18; 716/3; 716/9; 716/10
(58) Field of Search .................................. 716/1, 2–18

(56) References Cited

U.S. PATENT DOCUMENTS

| | | | | |
|---|---|---|---|---|
| 5,359,537 A | * | 10/1994 | Saucier et al. | 716/18 |
| 5,537,330 A | * | 7/1996 | Damiano et al. | 716/18 |
| 5,781,430 A | * | 7/1998 | Tsai | 700/28 |
| 5,878,408 A | * | 3/1999 | Van Huben et al. | 707/1 |
| 6,023,565 A | * | 2/2000 | Lawman et al. | 716/1 |
| 6,058,426 A | * | 5/2000 | Godwin et al. | 709/229 |
| 6,102,961 A | * | 8/2000 | Lee et al. | 716/1 |
| 6,253,358 B1 | * | 6/2001 | Takahashi | 716/6 |
| 6,298,472 B1 | * | 10/2001 | Phillips et al. | 716/18 |
| 6,470,486 B1 | * | 10/2002 | Knapp | 716/18 |
| 6,516,453 B1 | * | 2/2003 | Knapp | 716/6 |

* cited by examiner

*Primary Examiner*—Matthew Smith
*Assistant Examiner*—Magid Y. Dimyan
(74) *Attorney, Agent, or Firm*—Glenn Patent Group; Michael A. Glenn

(57) ABSTRACT

A business-to-business application service provider includes an Internet website and webserver with EDA-on-demand solutions for system-on-a-chip designers. Such website allows electronic designs in hardware description language to be uploaded into a front-end EDA design environment. A behavioral model simulation tool hosted privately on the webserver tests and validates the design. Such tool executes only in the secure environment of the business-to-business application service provider. The validated solution is then downloaded back over the Internet for a pay-per-use fee to the customer, and in a form ready to be placed and routed by a back-end EDA tool. Such validated design solutions are also downloadable to others in exchange for other designs, or available in technology libraries. The intellectual property created can be re-used, sold, shared, exchanged, and otherwise distributed efficiently and easily from a central for-profit clearinghouse.

30 Claims, 15 Drawing Sheets

```
always begin: main
      @(posedge clock);
      x=0;
      while (! ready)
            @(posedge clock);
      repeat (5) begin: L1
            @(posedge clock);
            if (x<0) disable L1;
            x=x+input;
      end
end
```
2002

2004

2006

BEHAVIORAL-SYNTHESIS ELECTRONIC DESIGN AUTOMATION TOOL BUSINESS-TO-BUSINESS APPLICATION SERVICE PROVIDER

This application is related to and claims the benefit of priority of U.S. provisional patent application Serial No. 60/136,127 filed May 26, 1999, and of U.S. provisional patent application Serial No. 60/135,902 filed May 26, 1999 and of U.S. provisional patent application Serial No. 60/136,126 filed May 26, 1999.

BACKGROUND OF THE PRESENT INVENTION

1. Technical Field

The present invention relates to electronic design automation and more particularly to behavioral-synthesis tools provided on a pay-per-use basis over the Internet.

2. Description of the Prior Art

Silicon chip usage has increased dramatically in recent years. Multi-million gate application-specific integrated circuits (ASIC's) are being used in all types of applications, e.g., mobile phones, networking equipment, DVD players, etc. But many designers of such complex systems are using outdated electronic design automation (EDA) tools and methodologies from the mid-1980's, when chip sizes ranged between 50K and 100 K gates. Design teams now spend an inordinate amount of time trying to get many point tools to work together. These problems, coupled with manpower shortages and shorter product cycles, are widening the gap between design requirements and the capabilities of conventional technology.

Such ineffective tools mean longer design times in markets with ever shorter product lives. Large ASIC development efforts need many more design engineers, and these are coming in very short supply.

Conventional EDA tools are now hampering a transition to systems-on-chip (SoC) designs. A new architectural and next-generation logic synthesis technology is needed that is significantly faster and has larger capacity than existing tools.

Designers need to move to a higher level of abstraction, to overcome complexity and verification issues in handling multimillion-gate RTL and architectural-level designs.

Conventional sales/distribution of EDA tools is also problematic. New ways are needed to put advanced EDA tools in front of the designers when they need them, and to charge such customers only when the EDA tools are actually used. The Internet now offers a new way to market and distribute EDA tools.

One EDA tool needs to be offered for all front-end design phases, e.g., architectural, RTL, datapath, logic. Architectural synthesis would enable true system-level design at ten times larger capacity. Faster runtimes would permit better quality-reliability (QoR) because global optimization is possible. A new EDA tool is needed with two-to-five times reduction in code and design time.

SUMMARY OF THE PRESENT INVENTION

Briefly, a business-to-business application service provider embodiment of the present invention includes an Internet website and webserver with EDA-on-demand solutions for system-on-a-chip designers. Such website allows electronic designs in hardware description language to be uploaded into a front-end EDA design environment. A behavioral model simulation tool hosted privately on the webserver tests and validates the design. Such tool executes only in the secure environment of the business-to-business application service provider. The validated solution is then downloaded back over the Internet for a pay-per-use fee to the customer, in a form ready to be placed and routed by a back-end EDA tool. Such validated design solutions are also downloadable to others in exchange for other designs, or available in technology libraries. The intellectual property created can be re-used, sold, shared, exchanged, and otherwise distributed efficiently and easily from a central for-profit clearinghouse.

DETAILED DESCRIPTION OF THE PRESENT INVENTION

Figure 1:
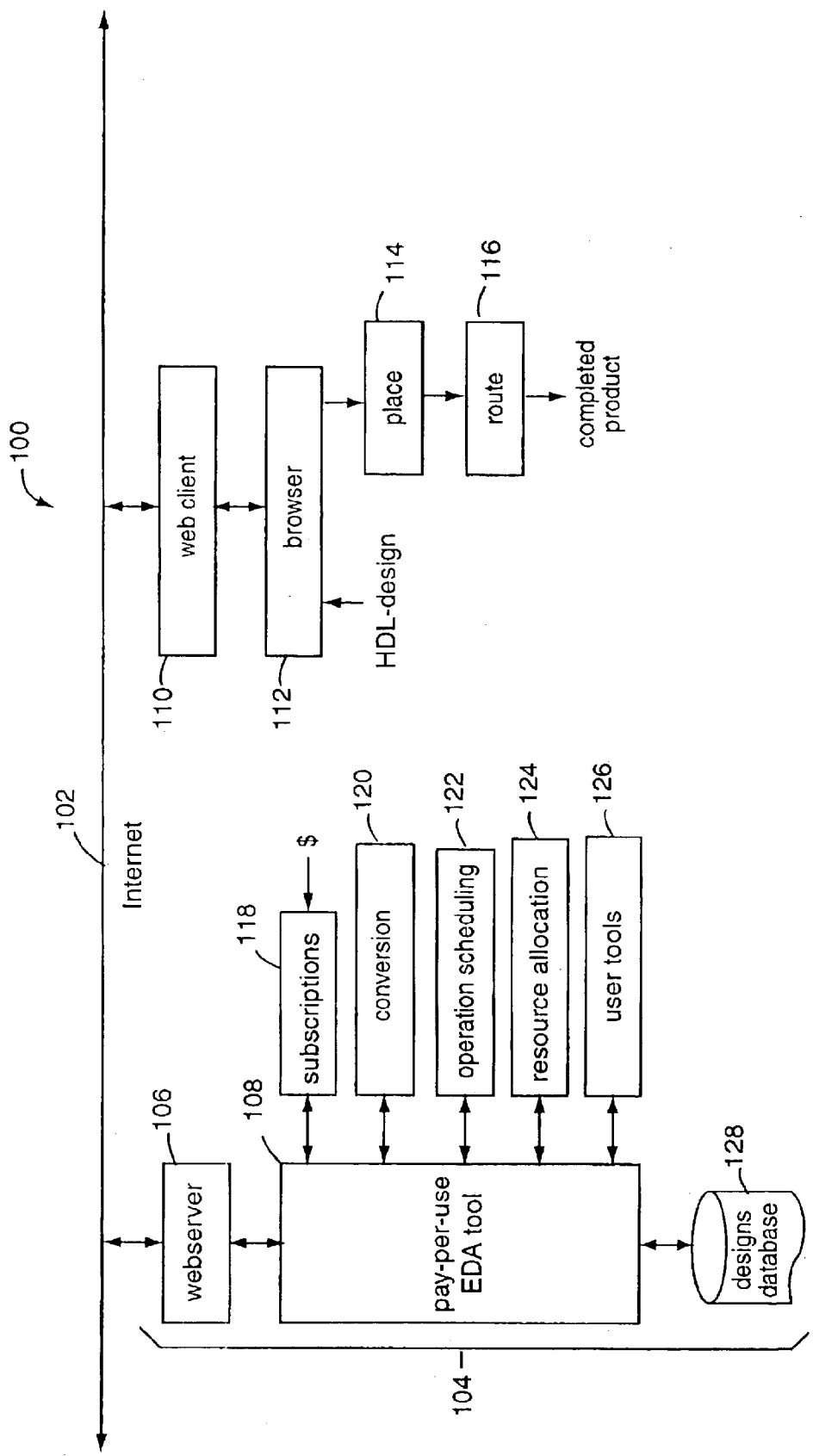
FIG. 1 is a functional block diagram of a business-to-business application service provider embodiment of the present invention that includes an Internet website and webserver with EDA-on-demand solutions for system-on-a-chip designers.

FIG. 1 represents an Internet system embodiment of the present invention, and is referred to herein by the general reference numeral 100. The system 100 includes an Internet connection 102 for a business-to-business application service provider 104 that sells high-level synthesis (HLS) services and intellectual property. Such application service provider 104 has a webserver 106 with, e.g., WINDOWS-NT, IIS, and ASP, commercial software from Microsoft to host client web browser visits. A pay-per-use electronic design automation (EDA) tool 108 is installed as a software application on the webserver 106. Any of a number of users and customers are represented by a web client 110 and browser 112. An architect's electronic design in hardware description language (HDL) is uploaded over the Internet 102 for simulation and design verification by the EDA tool 108. Once complete, the verified result is downloaded back to a place back-end process 114 and a route back-end process 116.

The EDA tool 108 is supported by a subscriptions module 118 that charges users a per-use-fee and allows uploading and downloading of designs. An HDL conversion module 120 translates HDL into control-flow (CF) graphs. An operations scheduling module 122 maps each HDL statement to an appropriate CF graph node. A resource allocation module 124 optimizes the hardware necessitated by the schedule. A collection of user tools 126 are included to help the users navigate, understand, and use the website. User designs, e.g., after uploading and for downloading, are stored in a database 128.

The business-to-business application service provider 104 preferably includes on-the-fly timing analysis of a digital design during a scheduling phase of a high-level synthesis. An abstract timing model expresses a bit-level timing of a component without incurring the complexity penalties of a conventional full timing analysis. A fast, accurate estimate of the timing consequences of each scheduling decision is available. Such estimates can then be used to determine if any scheduling decision should be rejected.

High-level synthesis (HLS) automates certain subtasks of a digital system design in an electronic design automation (EDA) system. A system architect begins by designing and validating an overall algorithm to be implemented, e.g., using C, C++, a specialized language, or a capture system. The resulting architectural specification is partitioned into boards, chips, and blocks. Each block is a single process having its own control flow. There are usually tens to hundreds of such blocks in a modern large-scale chip design. Typical blocks represent whole filters, queues, and pipeline stages. Once a chip has been partitioned into its constituent blocks, any needed communication protocols have lo be constructed. Such protocols use cycle-by-cycle communication between blocks.

So-called "scheduling" and "allocation" are applied one block at a time. Scheduling process 122 assigns operations such as additions and multiplications to states of a finite-state machine (FSM). Such FSM describes a control flow in an algorithm performed by a block being synthesized. Some operations are locked into particular states, and represent communication with other blocks. These input/output operations cannot be moved, or rescheduled, from one state to another, because to do so would probably upset the block-to-block communication protocol.

However, some other operations can be moved from one state to another. Moving operations from states that have many operations to states that have few allows hardware resources to be more evenly shared among operations. Timing problems can sometimes be resolved by moving certain operations from states in which operation delays cause timing problems into states in which such problems don't exist.

Allocation process 124 maps the operations of a scheduled FSM to particular hardware resources. For example, three addition operations can be scheduled to only require a single adder. An appropriate adder is constructed, and the operations are assigned to the adder. But complications can arise when more than one hardware resource of a given bitwidth and function is needed. And so which resource to use for each operation must be decided. Considerations include multiplexing cost, the creation of false timing paths, register assignment, and even using a large resources for small operations. Hardware resources can be used for multiple functions. Calculating a minimum set of resources for an entire process is difficult but rewarding. Sometimes alternative implementations will be possible. It is often possible to choose implementations that meet the overall timing constraints and minimize the gate count. Resource allocation also includes mapping resources (abstract functions) to gate level implementations.

Allocation includes calculating a register set and assigning data to registers for use in later states. For example, temporary variables are used to store intermediate results in a larger calculation. But the contents of such temporary variables could share a common register in different states. The contents are only needed in one state each. So it is possible to save on hardware by assigning the data that needs to be stored to such storage elements. But register and storage allocations can be complicated if data values can form mutually exclusive sets or can share storage. Data values often drive functional resources, and in turn are often produced by functional resources. A good assignment of data to storage will result in reduced multiplexing costs and delays. The allocation is also made more complex if any register and functional hardware interact.

Technology-independent, or Boolean, optimization follows scheduling and allocation. The circuit design comprises generic AND and OR gates connected in a netlist.

Technology-independent optimization minimizes the number of literals in the netlist. An abstraction of Boolean gates lends itself to a highly mathematical treatment based on Boolean arithrmetic. For example, the Boolean identity AB+AC=A(B+C) can be used to reduce the corresponding gate network.

Technology mapping follows Boolean optimization, the abstract Boolean gates of the circuit are mapped to standard cells from a technology library. Standard library cells include simple AND, OR, or NOT functions, and much more complex functions. For example, full adders, and-or-invert gates, and multiplexers. Technology-library gates are available in a variety of drive strengths, delays, input loadings, etc. Technology mapping is made more complex by the fact that there are many ways to map an individual Boolean gate, and each way having its own unique advantages.

Technology mapping can sometimes be avoided by constructing custom gate layouts for the gates of a circuit, instead of selecting cells from a library of preconstructed and precharacterized cells. But this method is not commonly associated with automatic synthesis.

The layout tasks of cell placement and net routing follow technology mapping, the physical position of each cell on the chip is established (placement), and the nets necessary to interconnect the cells are laid out (routing). In application service provider 104, the design intellectual property is downloaded to the user for placing and routing.

Figure 2:
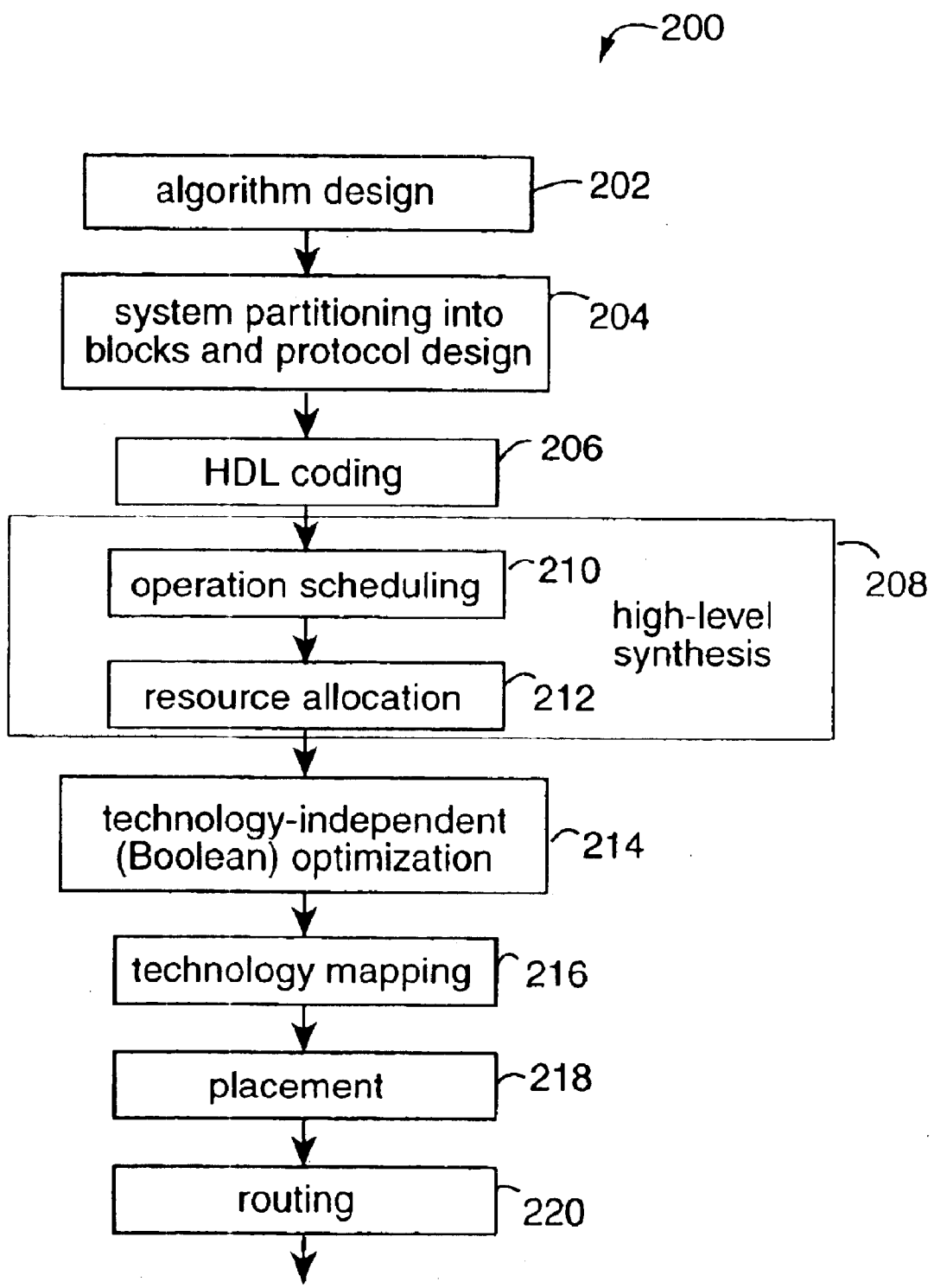
FIG. 2 is a flowchart diagram of an electronic design automation method embodiment of the present invention.

FIG. 2 represents an electronic design automation (EDA) method embodiment of the present invention, and is referred to herein by the general reference numeral 200. The EDA method begins with an algorithm design step 202. The system design is partitioned into blocks and protocol design in a step 204. Verilog or other kind of hardware description language (HDL) coding is done in a step 206. A high-level synthesis (HLS) step 208 includes an operation scheduling step 210 and a resource allocation step 212. A timing analysis is applied each time an individual operation is scheduled, and may be called many times to get a single operation scheduled. A technology-independent (Boolean) optimization step 214 follows. A technology mapping step 216 maps the abstract Boolean gates of the circuit to standard cells from a technology library, for example. A placement step 218 locates the gates on the chip real estate, and a routing step 220 interconnects them with wires.

The timing analysis starts with a state diagram, a collection of resources, a technology library, and at least partially scheduled and allocated operations. It determines whether a design as a whole meets its timing requirements. The total delays of such circuit must be such that valid data can be latched into destination registers at the end of each clock cycle. A scheduling system can be used to construct realistic schedules, and result in allocated circuits that have a good probability of meeting timing after layout.

The timing analysis starts with a state diagram, a collection of resources, a technology library, and at least partially scheduled and allocated operations. It determines whether a design as a whole meets its timing requirements. The total delays of such circuit must be such that valid data can be latched into destination registers at the end of each clock cycle. A scheduling system can be used to construct realistic schedules, and result in allocated circuits that have a good probability of meeting timing after layout.

Timing questions must be answered quickly and efficiently, because they will be asked many times in the course of scheduling a single design. For example, in a list-scheduling algorithm, the transitions of the design are considered individually, and in order. For each transition, a set of "ready" operations is constructed. The ready operations are those with input data that is available in the source state of the transition. One of these operations is selected using some criterion, e.g., most urgent first, and is removed from the ready list and assigned to a resource that is otherwise unused in the current transition. Its result data is then added to the set of data that is available. Other operations that depend on its results may then be added to the ready list. Such process continues until no more operations are in the ready list, or there are no more resources available to perform the operations on the ready list, or the operations on the ready list cannot be scheduled on the current transition. This repeats until all of the arcs have been considered and all of the operations have been scheduled. The timing process stops if the design cannot be scheduled using a given resource set.

Timing analysis must be done each time an individual operation is scheduled. If a first candidate operation-transition-resource scheduling tuple is not accepted, the timing analysis procedure must be called repeatedly until one is accepted. The timing analysis procedure must be able to evaluate the timing for all of the resources of a design each time a scheduling tuple for anloperation is considered.

Furthermore, the timing analysis must be bit-true, as opposed to bitwise-lumped. When characterizing the delays of the various resources, a single number or a single load/delay function associated with each resource is inadequate. A delay or load/delay function must be associated with each output bit of a resource.

A fast, accurate, bit-level timing model for a combinational resource can be constructed because a graph representing combinational logic can always be partitioned into a collection of trees. A logic tree uses its nodes to represent gates and terminals, and its arcs represent connections. Electrical drivers are always below the gates they drive in a logic tree, e.g. farther from the root, or else the root of the tree and the gates it drives are in another tree. The terminals of a tree represent its connections to gates outside the logic tree. When a gate in the network has a fan-out of two or more, the root of a maximal logic tree is the output terminal of such gate. All other trees become subtrees.

Figure 3:
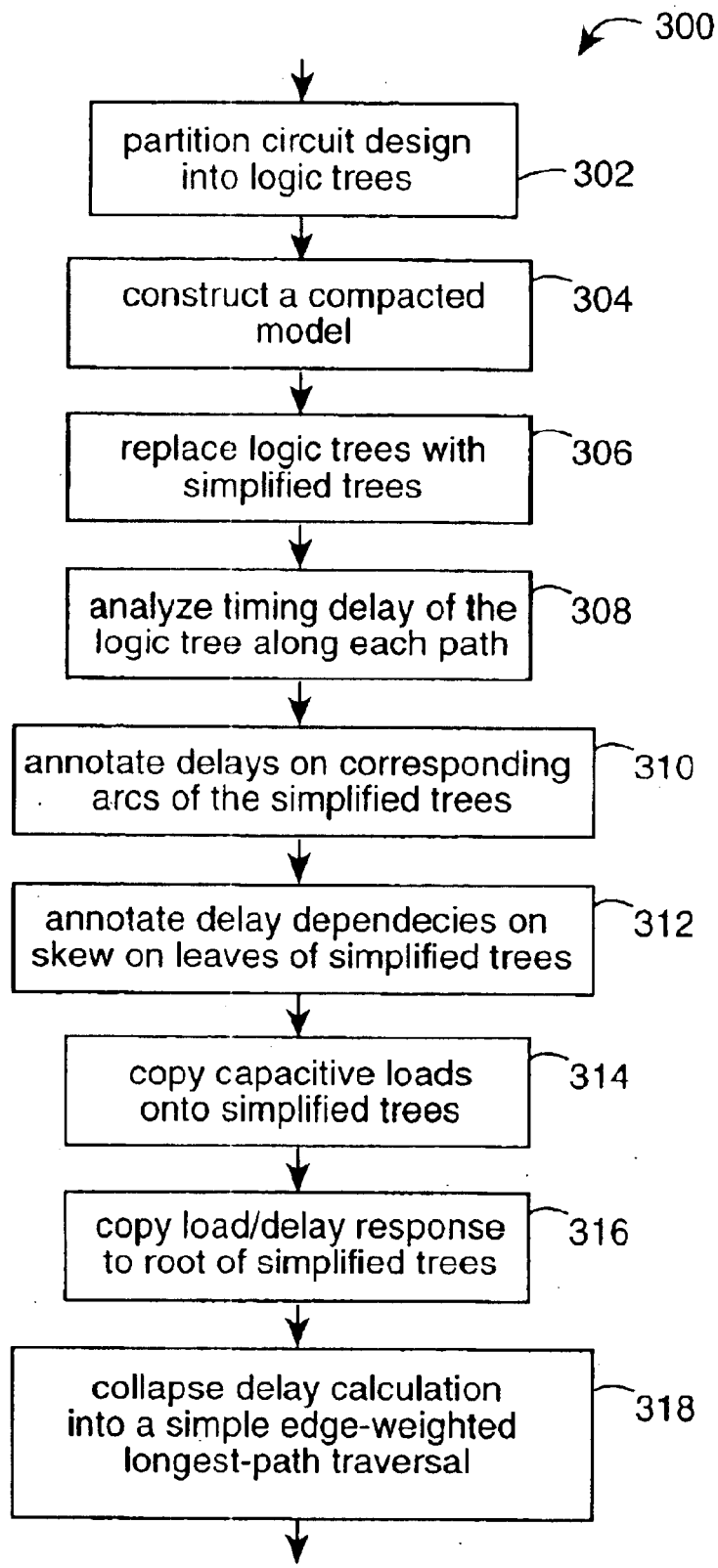
FIG. 3 is a flowchart diagram of a timing analysis method embodiment of the. present invention.

FIG. 3 represents a timing analysis method of the present invention, and is referred to herein by the general reference numeral 300. The method 300 begins with a step 302 that partitions a circuit design into its corresponding logic trees. Once a circuit that has been partitioned into logic trees, it becomes possible to construct a compacted model of the circuit in a step 304. Logic trees are replaced with equivalent trees having no interior nodes, e.g., as in a step 306. These equivalent trees are often substantially simpler than the original trees. In a step 308, the timing in the original circuit is analyzed along each path from a tree leaf to itsroot. A propagation delay calculated for each path. In a step 310, such computed delays are annotated onto the corresponding arcs of the simplified trees. In a step 312, any dependency of a propagation delay of the original circuit on the slew rate of the input signal is annotated onto the corresponding leaf of the simplified tree. A step 314 copies capacitive loads from the leaves of the logic tree to the leaves of the simplified tree. The load/delay response curve of the output gate, e.g., at the apex of the logic tree, is copied in a step 316 to the root of the simplified tree.

Some edge effects like slew and load dependency might be subsumed into the path delays in embodiments of the present invention. But these additional terms only need to be computed for trees with terminals on a boundary of an entire resource. In a step 318, the entire delay calculation thus collapses into a simple edge-weighted longest-path traversal within the interior of an abstract timing model of a resource. This enables much faster timing analysis compared to computing slew rates and delays for each cell of a circuit.

Figure 4C:
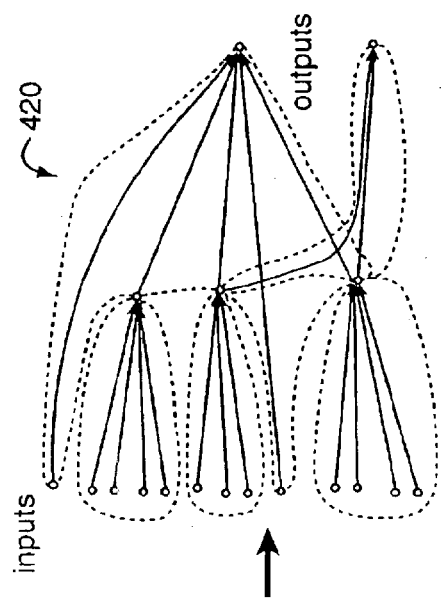
FIGS. 4A, 4B, and 4C, are diagrams that represent the transitions from a circuit, to a logic tree, and a simplified tree.
Figure 4B:
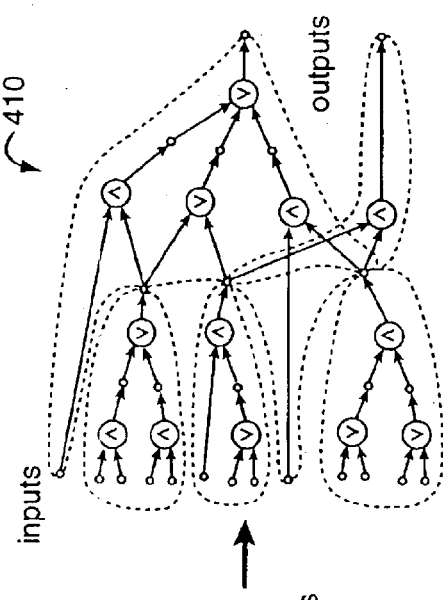
Figure 4A:
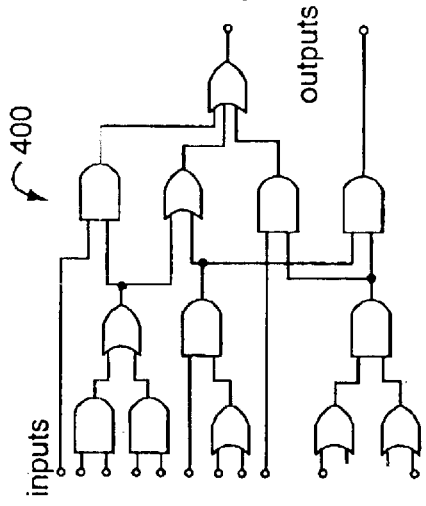

FIGS. 4A, 4B, and 4C, represent the transitions from a circuit 400, to a logic tree 410, and a simplified tree 420. In FIG. 4B, the logic gates are represented as nodes in the tree. The AND-gates have a pointed-up chevron symbol, and the NOR-gates have the down-pointed chevron. In FIG. 4C, the nodes are eliminated entirely. In subsequent steps in embodiments of the present invention, the simplified tree 420 is decorated with annotations that provide quick answers about delay issues in circuit 400 (FIG. 4A). The dotted envelopes show the subtrees.

Figure 5:
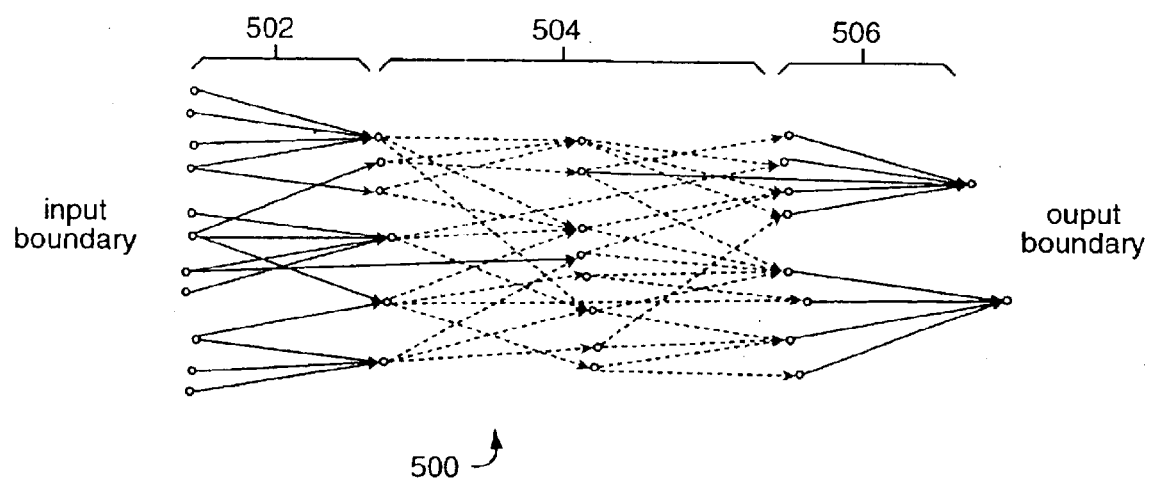
FIG. 5 is a diagram representing a design that comprises a set of complex-model arcs at the input boundary, a set of simplified-model arcs inside, and another set of complex-model arcs at the output boundary.

FIG. 5 represents a design 500 that comprises a set of complex-model arcs 502 at the input boundary, a set of simplified-model arcs 504 inside, and another set of complex-model arcs 506 at the output boundary. There may be some loss of accuracy associated with such use of a simplified model of propagation delay in the interior of a model, but in practice these inaccuracies appear to be insubstantial. If a loss of accuracy is an issue, the more complex models can be used on additional interior arcs. The accuracy would be increased, but so would the solution's run time. Only arcs touching circuit boundaries really need complex models. Arcs having simplified models are shown with dashed arrows.

When all of the logic trees representing a circuit have been mapped to simplified trees, the original resource circuit diagram can be discarded. All of the relevant timing information will be preserved in the network of simplified trees. It then becomes possible to analyze the timing of chained resources by using models of resources that are encapsulated in networks of simplified trees together with a graph-traversal algorithm that calculates arrival times. The simplified-model timing analysis graph traversals can enable an order of magnitude faster analysis than conventional methods.

Figure 6:
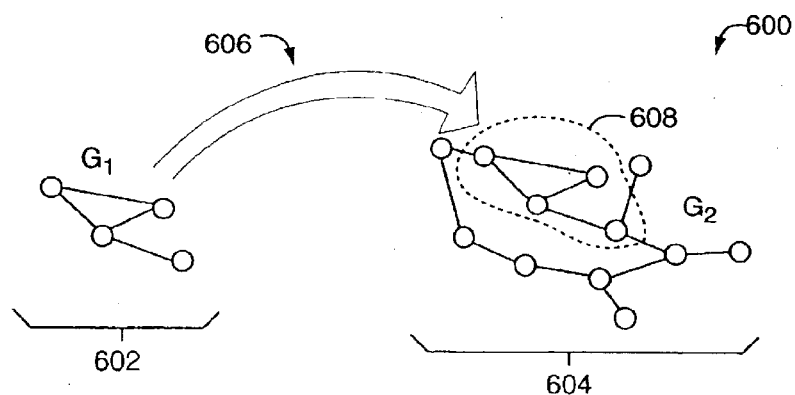
FIG. 6 is a diagram of a general graph-matching problem in electronic design automation.

FIG. 6 refers to a general graph-matching problem 600, where there are two graphs, a pattern graph 602 $G_1=(v_1, e_1)$, and a target graph 604 $G_2=(v_2, e_2)$. The goal is to find a one-to-one mapping 606 from the elements of the pattern to the elements of the target graph. A subgraph of $G_2$, defined by the matched nodes, must be isomorphic to $G_1$. An example of such a matching is shown here, with the matched nodes and arcs shown in an envelope 608.

Figure 7:
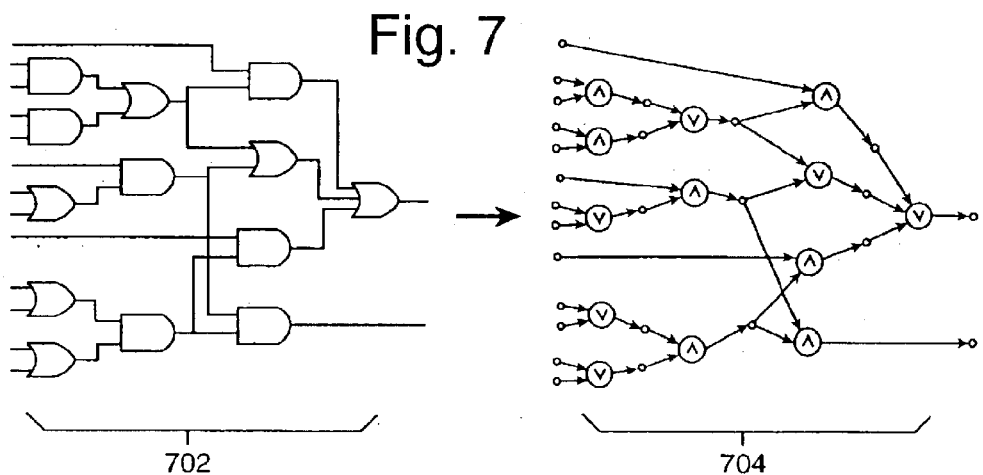
FIG. 7 is a diagram of a circuit and its corresponding bipartite graph representation.

FIG. 7 illustrates a circuit 702 and its corresponding bipartite graph representation 704. In essence, the gates are converted to nodes, and the interconnects to arcs. The particular technology-mapping matching problem differs from the more general problem of matching. Graphs extracted for circuits are directed bipartite graphs, e.g., $G=(v_1, v_2, e)$, where edges in "e" connect elements of $v_1$ to elements of $v_2$, but never elements of $v_1$ to $v_1$, or elements of $v_2$ to $v_2$. The edges are ordered pairs, e.g., they have a direction. The nodes in $v_2$ represent gates, and the nodes in $v_1$ represent circuit nets. Graph matching for bipartite directed graphs is such that a net node can only map to a net node, a gate node can only map to a gate node, and isomorphism is used to preserve the direction of edges. The nodes in bipartite graph representation 704 that represent gates have types, e.g., AND (^), OR (v), and NOT (!). These form part of the isomorphism construction. A node of type X in $G_1$ is mapped to a node of type X in $G_2$.

The prior art usually only matches trees. Directed acyclic graphs (DAG's) can be used to represent some types of multiple-output gates, and so combinational logic circuits can be represented by a DAG. That is, aslong as they contain no cycles. DAG's must also be well-formed and avoid including cyclic false paths.

Figure 8:
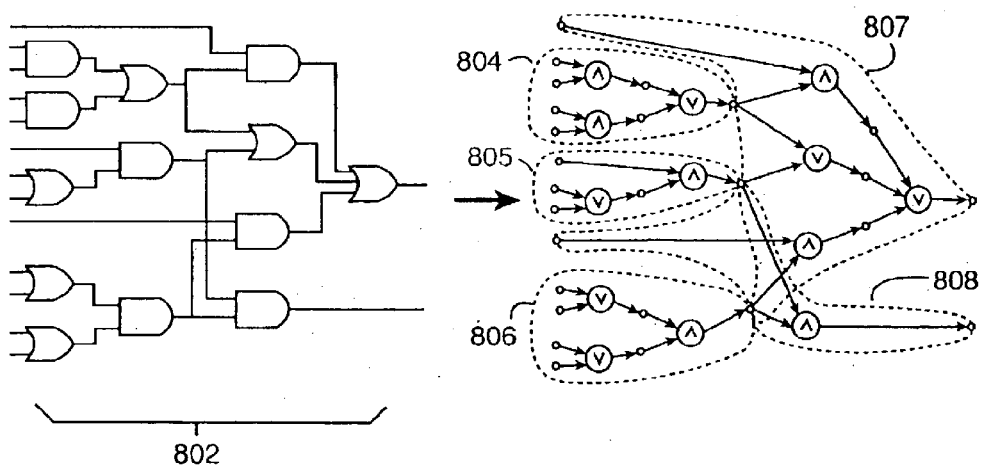
FIG. 8 is a diagram of a first step in technology mapping which is to partition a network graph into a collection of trees.

FIG. 8 illustrates a first step in technology mapping which is to partition a network graph 802 into a collection of trees 804–808 or DAG's. Each tree 804–308 can then be worked on as an individual mapping problem. The simplest formulation is to use trees, but an extension to DAG's would not be difficult. In general, the trees are defined so that their roots and leaves are all net nodes, as opposed to gate nodes. Root and leaf nodes are duplicated as many times as necessary, otherwise they will have to be shared between trees. The trees 804–808 should be as large as possible, e.g., maximal trees. In any extension to DAG's, the number of output terminals of a DAG must be limited to two, or other small number. Otherwise, the matching computations get too complex.

A typical technology library includes a number of cells that represent primitive elements. Combinational cells in the library have Boolean functions. A selection of bipartite directed graph representations is constructed for each cell. Each of these graphs is associated with the cell's Boolean function expressed in a small primitive-type alphabet. One convenient alphabet of primitive type is that of two-input NAND gates and inverters. Each cell of the library is described by a tree (or DAG) comprising only net nodes, two-input NAND nodes, and NOT nodes. The exact alphabet chosen is not crucial as long as it is relatively simple, and it is logically complete. All Boolean functions can be expressed as networks comprising only units of the alphabet.

Figure 9:
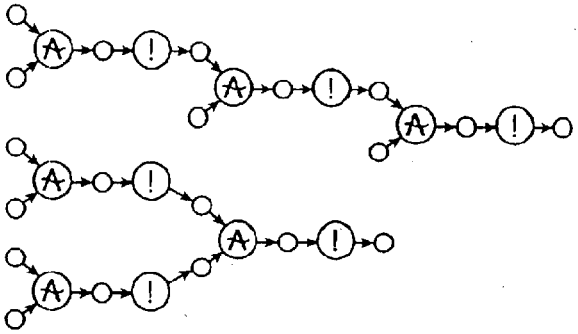
FIG. 9 is a diagram representing a decomposed technology library.

Such a decomposed library is shown in FIG. 9. Cell names are listed in the left column. The middle column lists the corresponding Boolean functions. And each cell is represented by one or more pattern trees as shown in the right column.

Any circuit designs submitted to technology mapping processes are usually represented as networks of simple gates, e.g. NAND, AND, NOR, OR, XOR, and NOT. Each network can be converted to a functionally equivalent network using only the library-tree gate types and fan-ins. For the example library of FIG. 9, the circuit would be converted into an equivalent circuit comprising only inverters and two-input NAND gates. It is then mapped into a bipartite directed graph representation, e.g., in the same style as the library-pattem graphs. After that, it is possible to do the graph matching. Both the library cells and the circuit to be mapped are represented using the same graph formalism.

The trees of a circuit are individual matching problems. Any matching results are preferably encoded by attaching a list of matching pattern trees to each net node N. Such list represents a set of pattern trees whose roots match N. The following pseudocoe implements such, and refers to this list as matchings(N),

```
Let R be the root of a circuit tree T.
Let S be a set comprising initially only of R.
While (S is nonempty) {
    Let N be an element of S. Remove N from S.
    For (all members P of the set of pattern trees in the library)
        If (matches(root(P), N)) {
            Add M to matchings(N).
        }
    }
if (N is not a leaf node of T) {
    Let G be the driver of N.
    Add all drivers of G to S.
    }
}
```

There are a number of ways to implement a tree-matching test with pattern-matching algorithms. For example, a recursive algorithm can recognize that a circuit tree matches a pattern tree if the roots match, and all the circuit-tree subtrees map to all the pattern-tree subtrees in matching pairs. The subtree mapping must be one-to-one circuit subtrees to pattern subtrees, each subtree of a circuit tree must map to exactly one subtree of a pattern tree. Every subtree of the pattern tree must be mapped to by some subtree of the circuit tree, e.g., "onto" mapping. Without this, more than one subtree of the circuit tree might be mapped to a single subtree of the pattern tree, or fail to map to some subtree of the pattern at all.

If one matching of subtree to subtree fails, another might succeed. The trees might be asymmetric. All permutations of the ordered list of subtrees of the pattern tree are tested against the ordered list of subtrees of the circuit tree. If all permutations fail, the match attempt as a whole is abandoned. A match is found if any permutation succeeds.

The following pseudocode implements a matching algorithm. All of the named nodes are net nodes. The gate nodes are net node drivers. A list "U" referred to in the if statement is a list of drivers of the net N, e.g., drivers of gate G that drive net node N. "M" is a net node of the pattern tree, and "N" is a net node of the circuit tree.

```
If(M is a leaf node) {
    Return true.
{else if (N is a leaf node) {
    Return false,
}else if (the type of the driver of M is the same as the type of
the driver of N) {
    For (all permutations P of the list of drivers of the driver of M) {
        Temp = true;
        Let U be the list of drivers of the driver of N.
        For (all       elements p of P, and u of U, in order) {
            If (matches(p, U) is false) {
                Temp = false;
                Go to Continue.
            }
        }
    Continue:
        If (Temp) {
            (P, U) is a successful one-to-one and onto mapping.
            Return true.
        }
    }
    If you get to this point there is no one-to-one and onto mapping.
    Return false.
}else{
    Return false.
}
```

In this form, such algorithm becomes increasingly expensive as the fan-in of the technology library cells increase. The complexity is exponential. The algorithm can be sped up, but this one is fast enough for most current technology libraries.

The matching step produces a one-to-many mapping from the net nodes of the circuit to root nodes of pattern trees. Such mapping candidates are functions that take a net node as their argument, and return a list of pattern trees. An implementation of the circuit becomes a set of net nodes, for which one member of the candidate set is selected. The set of net nodes chosen will usually be smaller than the entire set of net nodes because some net nodes will be "buried" inside patterns that have interior net nodes.

Figure 10:
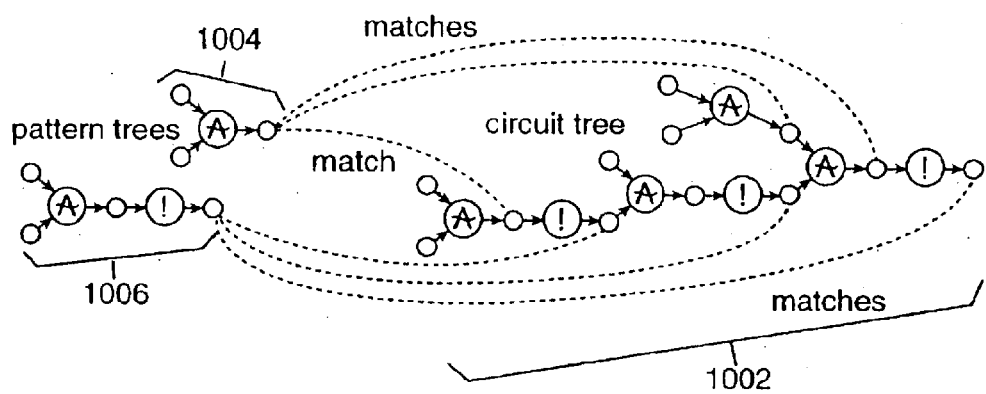
FIG. 10 diagrams a circuit tree on the right, and the only two pattern trees on the left that are needed to match every part of the circuit tree.

FIG. 10 shows a circuit tree 1002 on the right, and the only two pattern trees 1004 and 1006 on the left that are needed to match every part of the circuit tree. Each of the possible matches of a pattern tree to a piece of the circuit tree net nodes is shown as a dashed line. Thus the entire circuit can be "covered" with as few as four gates if a proper subset of six matchings shown is chosen. In other words, the circuit tree can be decomposed into four constituent gate types. Subsets of the six matchings shown could produce redundant or incomplete coverings. The challenge is to select a subset of the matchings that minimizes delay and redundancy, and that covers.

Figure 11:
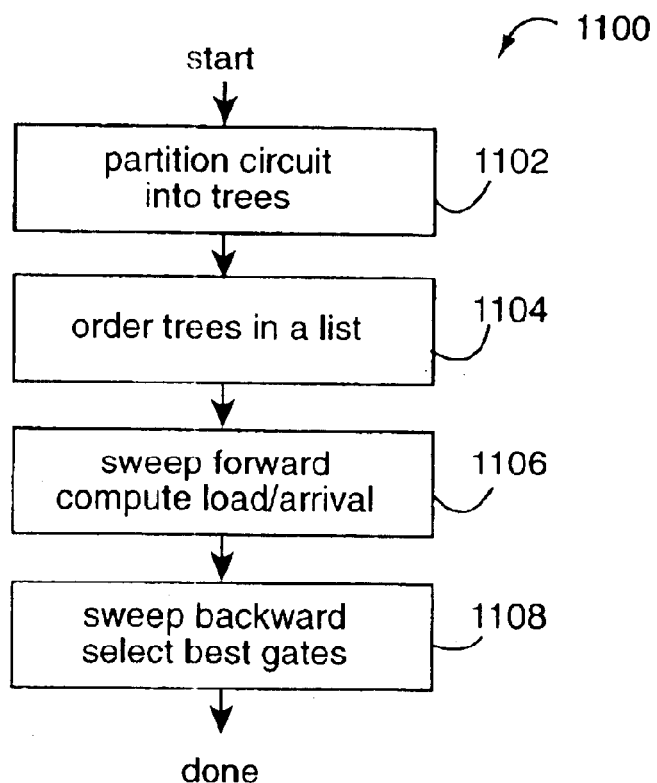
FIG. 11 is a diagram of a covering selection method embodiment of the present invention.

FIG. 11 represents a covering selection method embodiment of the present invention, and is referred to herein by the general reference numeral 1100. In a step 1102, a circuit is partitioned into trees. In a step 1104, such trees are ordered using a topological sorting algorithm. A depth-first graph traversal algorithm can be used. A rule of ordering states that a tree "T" must precede all trees whose leaves "L" it drives, and it must succeed all trees that drive any leaves "L" of tree "T". This ordered list of trees is called "O".

In a step 1106, a sweep forward in the ordered linear list is made while computing a set of Pareto-optimal load/arrival curves for each of a plurality of net nodes that match a technology-library element. In a step 1108, a sweep backward in the ordered linear list is made while using the set of Pareto-optimal load/arrival curves for each of the net nodes and a capacitive load to select a best one of the technology-library elements with a shortest signal arrival time. Only net nodes that correspond to a gate input are considered, and any capacitive loads are always predetermined.

Figure 12:
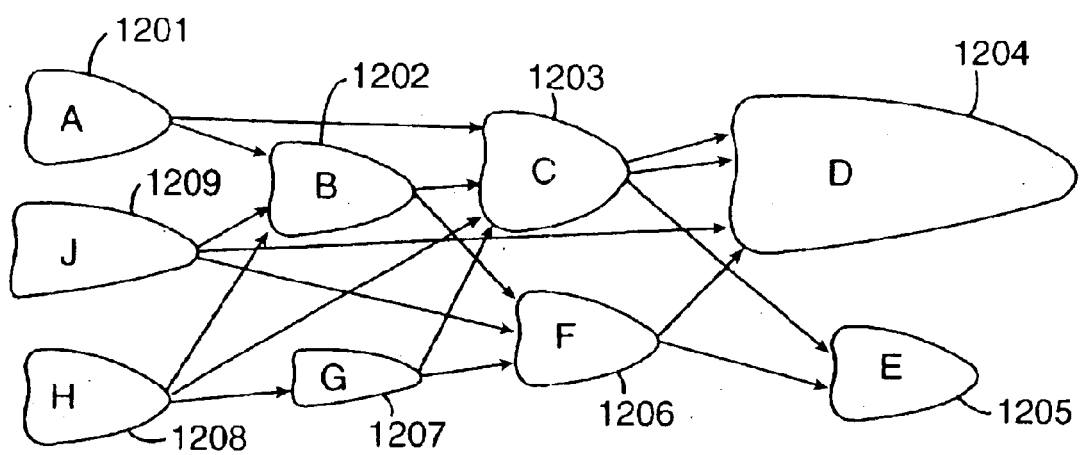
FIG. 12 is a diagram representing the partitioning of a circuit into trees, and the ordering of those trees into a list that conforms to a basic rule.

Such trees "T" representing a circuit and an ordered list is represented in FIG. 12. A first tree 1201 in "O" is arbitrarily labeled "A". The other trees 1202–1209 are labeled "B" through "J". A topological ordering of the trees that satisfies the rule is A, H, G. J, B, C, F, E, D. Since trees-A, J, and H are at the input boundary, no other trees can drive any of trees-A, J, or H. So it is permissible under the rule to place tree-A at the head of the ordered list "O". The ordering of trees A, H, G, J, B, C, F, E, D allows each tree to be evaluated in an order where no tree will have a still-to-be-evaluated input tree.

At the input boundary, the signal arrival times at the leaves of tree-A can be postulated. They represent primary inputs of the combinational part of the circuit, and such signal arrival times can be obtained from the circuit's environment or from user constraints.

Each leaf L of tree-A has no candidate matchings. A load/delay curve can be attached to each leaf of tree-A. Such load/delay curve is any load/delay curve associated with a postulated driver of a primary input that L represents.

A root of tree-A is its output net. At least one candidate from the technology library must match, or the process must stop. An aggregate load/delay curve can be computed for the root of tree-A, e.g., using an algorithm with a recursive procedure like this,

```
Given net node N with candidate matching set C.
Initialize the aggregate load/delay curve of N.
For (each element c of C) {
    For (each leaf node X of c) {
        Let Y be the net node of T corresponding to X.
        Recursively compute the aggregate load/delay curve at Y.
        Look up the load associated with X in the library,
            and compute the signal arrival time at X,
            based on the load and the load/delay curve at X.
    }
    The arrival times at each of the leaves of c are now known.
    Compute the arrival time at N as a function of load
        and the electrical characteristics of the library element that c
represents.
    Add the curve so computed to the aggregate load/arrival curve of N.
}
```

In effect, this algorithm scans the matching candidates of N, and for each candidate "c" computes arrival times at the inputs of "c" under the assumption that "c" will be selected. It can then calculate a load/arrival curve at N from the known characteristics of "c" and consequently the signal arrival times at the inputs of "c". The set of load/arrival curves is generated to represent each of all the possible matchings of cells to N.

The aggregate load/delay curve representations can be made to be efficient. At any load there is a single optimal delay for a particular cell "c". All other members of "c" can do no better than to match the same arrival time for that load.

Thus the load/arrival curve at N is preferably a function that maps loads to optimal members of "c". This function can be generated by taking the piecewise minimum of the aggregate load/delay curve.

An optimal gate choice needs to be made in view of a particular capacitive load. E.g., the load range for which a gate-G2 is best, is from zero load to the breakpoint. Best is defined as having the shortest signal arrival time (least delay). The load range for which a gate-G1 is best is from the breakpoint to infinity. An aggregate curve at N can be used to find both an arrival time and a best gate to map to N, given the capacitive load being driven.

When starting with an ordered list of trees, the first tree to consider is one driven only by primary inputs. Any succeeding trees will either be driven by primary inputs, or by trees that have already been processed. So every tree-T to be considered in its order is guaranteed to be driven only by primary inputs or trees that have been previously considered. Every driver at the input of a tree-T will have a known Pareto-optimal load/arrival curve at the time tree-T is considered. A Pareto-optimal load/arrival curve in is computed for each of the primary outputs of the circuit.

A final step chooses a load for each output-O. Initially, such load can be chosen arbitrarily, as long as it falls in the range of an aggregate load/arrival curve for output-O. The aggregate curve at output-O maps both the arrival time and the optimal gate G L1 to drive output-O. Setting the load dictates which library gate-G should be selected to drive output-O.

The tree whose root is output-O can be toured, beginning with the inputs of library gate-G. The input capacitances are known, because library gate-G is a known element in the technology library. This allows a simple look-up of the optimal gate to drive each of its inputs. This is repeated until there is a complete covering of tree-T.

If this covering process is applied to the ordered list of trees in reverse order, no tree will be considered unless all of the trees it drives have already been covered. The load on the root gate of that tree is considered. The covering process proceeds until all trees are covered. The technology mapping process is thus completed.

In summary, the selection process sweeps an ordered list of trees. First forward and then backward. In the forward pass, a set of Pareto-optimal load/arrival curves are computed for each net node matching a library element. In the backward pass, the load/arrival curves and load values are used to select a best gate to drive each node considered. Only nodes that correspond to gate inputs are considered. Because of this, loads are always known so the process can be completed.

Several background sources exist that can help with understanding and implementation. The basic idea of using matching trees and dynamic programming is detailed in Keutzer, *Technology Binding And Local Optimization By DAG Matching*, Proceedings of the 24th Design Automation Conference, IEEE, 1987, page 341. This paper covers the use of matching trees and an area-optimal formulation of the selection problem. It optimizes area and it does not use load/arrival curves. And it uses only a forward pass instead of two passes. Another refinement of matching trees that uses delay/area curves, is described in, Chaudhary, *A Near Optimal Matching Algorithm for Technology Mapping Minimizing Area Under Delay Constraints*, 29th Design Automation Conference, IEEE, 1994. However, in this work Pedram used area/delay curves, and so could not compute the effect of different loads, which is a crucial distinction.

Figure 13:
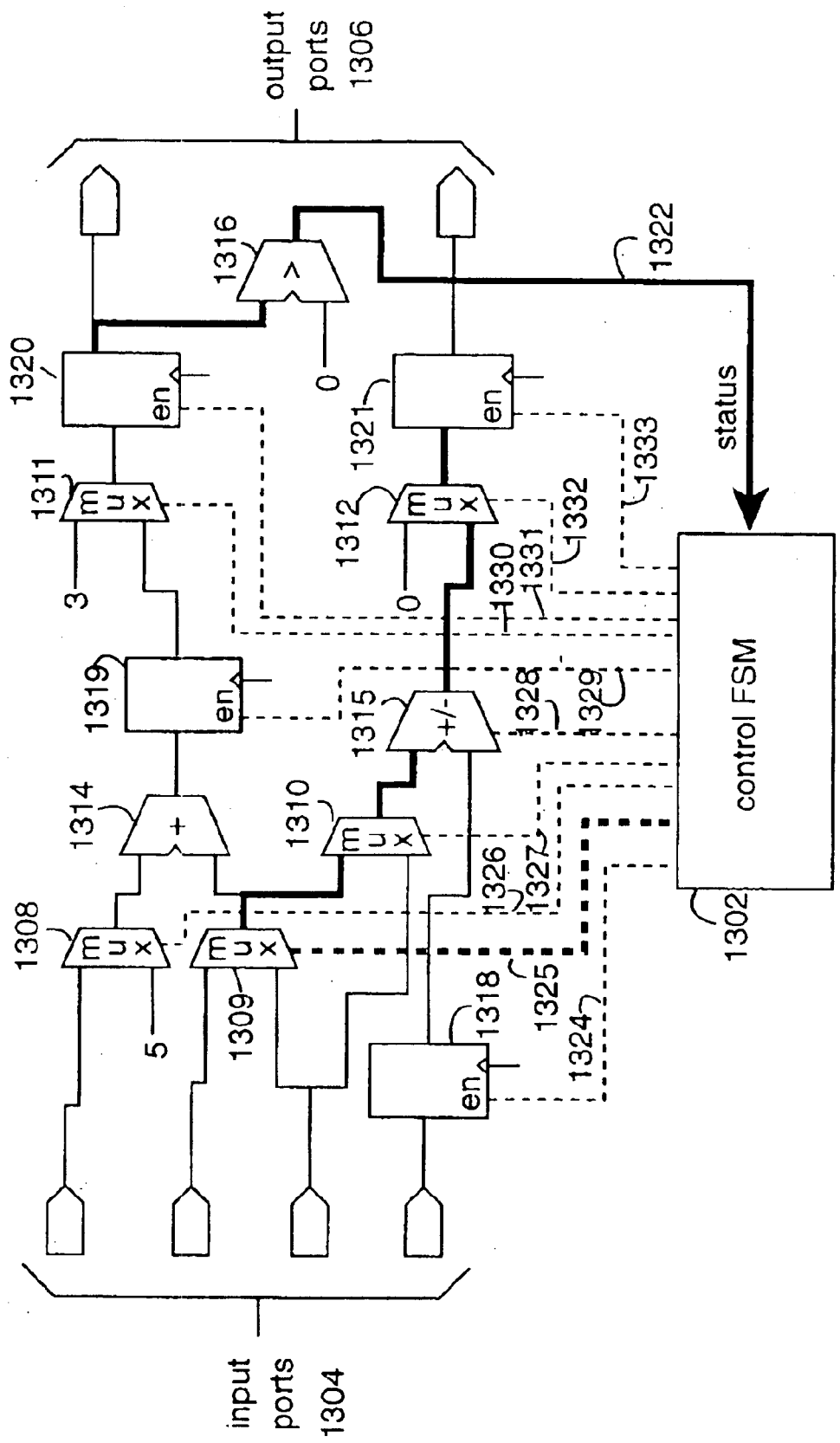
FIG. 13 is a diagram of an example that illustrates how control signals can dominate a critical-timing path.

FIG. 13 is an example that illustrates how control signals can dominate a critical-timing path. Control signals are shown in dashed lines, and critical-path signals are shown in heavier lines. A circuit 1300 includes a control FSM 1302. A critical signal propagation timing path will exist between a set of input ports 1304 and a set of output ports 1306. The circuit 1300 includes a number of multiplexers 1308–1312 controlled by the control FSM 1302, a number of adders 1314–1316, and a number of latches 1318–1321. A status signal 1322 is input by the control FSM 1302. The multiplexers 1308–1312 and the latches 1318–1321 depend on a set of control signals 1324–1333 output by the control FSM 1302. The ripple-through of signals from input to output will therefore be highly dependent on when the control signals 1324–1333 are issued and settle. The propagation delays of individual gates are relatively unimportant.

A control-flow graph is a directed graph that describes the flow of control in a source-code HDL description. There exists a direct mapping from an HDL description to a unique control flow graph. There also exists a direct mapping from such unique control flow graph to a finite-state machine, e.g., in a "bubble graph" representation. A direct mapping can also be made from the unique control-flow graph to a "one-hot" FSM circuit. A control FSM can therefore be generated in two steps that are independent of any later-constructed schedule. The point is, control FSM timing can be determined during scheduling.

Figure 14:
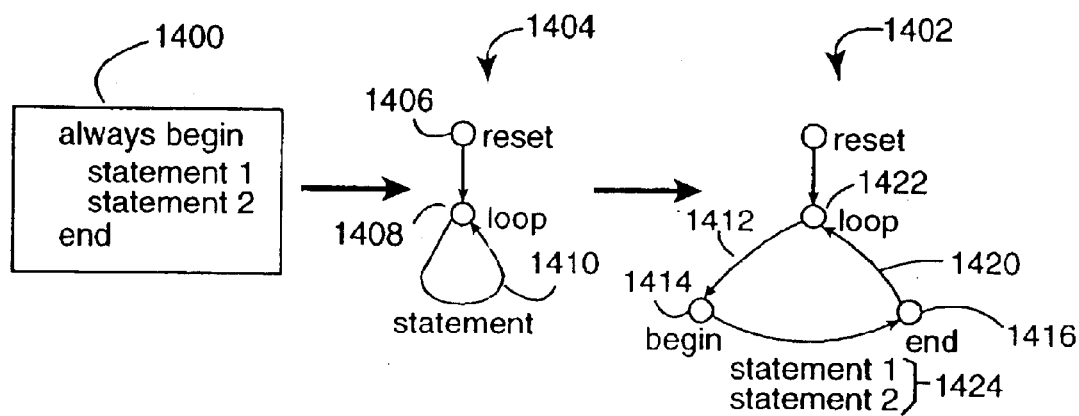
FIG. 14 is a diagram of a Verilog sequential block "begin . . . end" statement being transformed into a control-flow graph arc-A between a source node-S and a sink node-T.

In general, a control-flow graph-G includes nodes "V" connected by directed arcs "E". In FIG. 14, one node V in a control-flow graph-G is labeled "reset". Such node represents an initial point in control-flow graph-G. By definition, a "reset" node can have no in-arcs and only one out-arc. Any number of the other nodes in control-flow graph-G can be labeled as state nodes, or not labeled. These nodes must have at least one in-arc and at least one out-arc.

Figure 15:
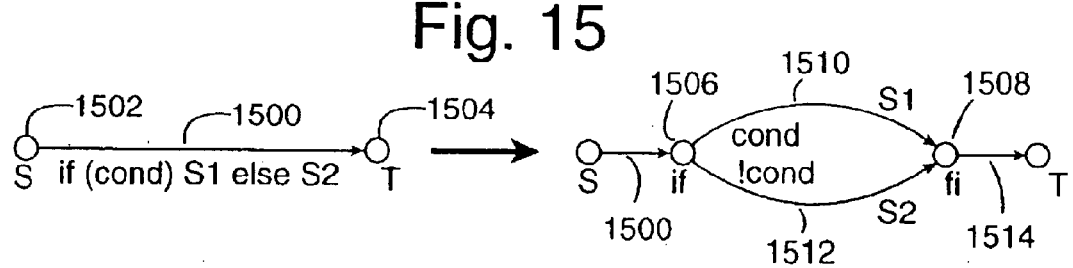
FIG. 15 is a diagram of an example of an "if" statement with all the options, and its control flow graph reduction.
Figures 16A, 16B, 16C, 16D:
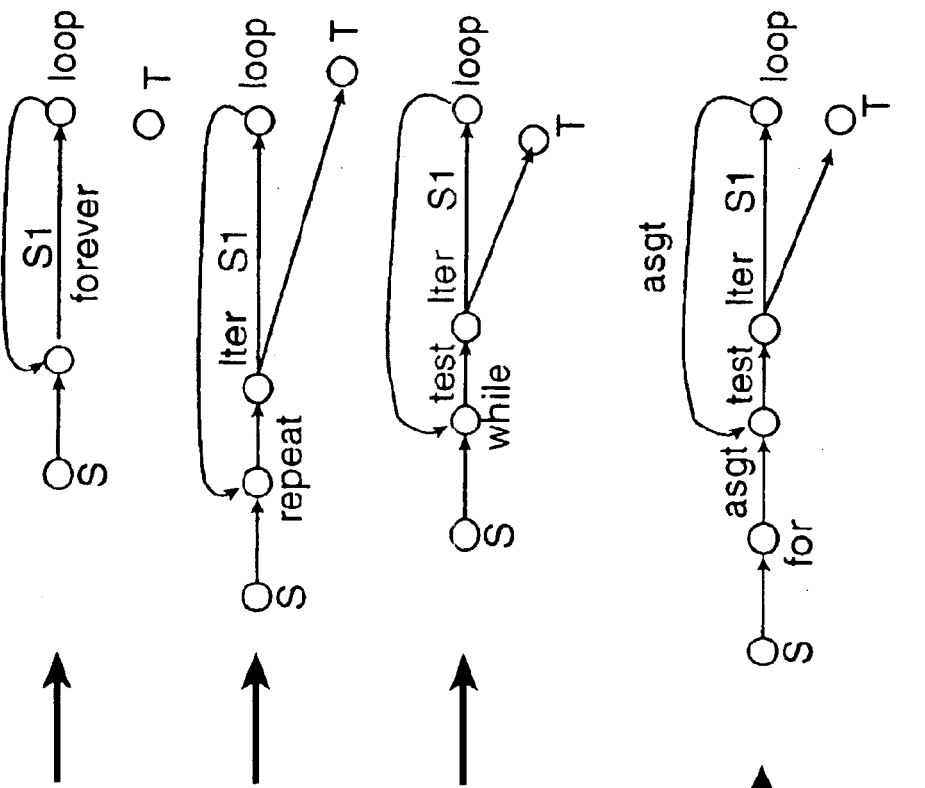
FIGS. 16A–16D are diagrams representing various forms of loops in Verilog and their corresponding control flow graph reductions.

As shown in FIG. 15, arcs can be labeled with conditions and action's. These are parse trees, or lists of parse trees, and are analogous to the conditions and actions of an FSM. The condition labels reveal which way control branches will go, e.g., "if". The action labels describe the operations that will take place if the flow of control goes along the arc labeled with the actions.

"Join nodes" are nodes with more than one in-arc, e.g., the "if" node of FIG. 15. "Fork nodes" are nodes with more than one out-arc, e.g., the "fi" node of FIG. 15. Other names or labels can be used that correspond to common programming constructs, e.g., "begin", "loop", and "end".

A control-flow graph-G is typically constructed from a parsed HDL text in a step-by-step reduction of the parse tree. Particular parse tree structures are recognized, and then corresponding subgraphs of G are constructed. Although Verilog is used herein in various example HDL and Verilog construct names, mappings can be made to VHDL and other imperative simulation-based HDL's allowing edge events.

Referring now to FIG. 14, the translation of a single process from a parse tree P 1400 to a control-flow graph-G 1402, begins with a simple graph 1404 having a reset node 1406 and a join node 1408 with a trivial self-loop 1410. In Verilog, a process is created using the "always" keyword, followed by a simple or composite "statement". The word "statement" is temporarily annotated onto the self-loop arc 1410 as its action, or operation. Where is no branch, so there is no "condition" label.

The simple graph-G 1404 can be transformed into a more-elaborate control-flow graph-G 1402 by applying a procedure to statements annotated on the arcs. For example, an arc that has a statement is replaced with two or more arcs and one or more nodes. The new arcs are then decorated with simpler statements and/or conditions. The new nodes may also be similarly labeled. Such procedure continues recursively until no more decomposable statements remain. The statements and conditions labeled onto the new arcs are particular subtrees of the statement's parse tree.

For example, a sequential compound statement in Verilog has the Backus-Naur form (BNF) syntactic definition,

```
sequential-statement::=begin <statement>* end
                     ||begin label: <statement>* end
```

Thus a typical Verilog process might be expressed with "statement1" and "statement2", as in statement 1400 in FIG. 14.

In FIG. 14, a Verilog sequential block "begin . . . end" statement can be transformed into a control-flow graph arc-A between a source node-S and a sink node-T. The arc-A is disconnected from sink node-T, and the sequential block parse tree-P is removed from arc-A 1412. Two new nodes 1414 and 1416 are constructed, "begin" and "end". The arrow-end of arc-A 1412 is connected to "begin" node 1414. A new arc-B 1418 is constructed, and its feather-end is connected to the "begin" node 1414, and its arrow end to the "end" node 1416. A new arc-C 1420 is constructed, and the feather end is connected to "end" node 1416, and its arrow end to a "loop" node 1422. All of the statements of the sequential block (e.g., the subtrees of P) are attached to arc-B 1418 as an ordered list of parse trees 1424.

For labeled blocks, the name of the block must be saved in a table that maps the name to the node "end". This node may become a jump destination of a Verilog "disable" statement.

The Verilog conditionals, "if . . . else" and "case . . . endcase", are handled roughly the same. A Verilog "if . . . else" statement starts with keyword "if", followed by a expression E, a statement S1 to be executed if the condition is true, and an optional keyword "else" and its statement S2 to be executed if the condition is false. An example of an "if" statement with all the options, and its control flow graph reduction, is shown in FIG. 15.

The "if" statement is reduced by introducing a fork node 1506 and a join node 1508, and arcs 1510 and 1512 connecting them, as well as a new arc 1514 that connects the join to T. The condition "cond" and its Boolean negation "Icond" are annotated onto the conditional arcs 1510 and 1512. These signify the conditions under which each branch will be taken. There might not be a statement associated with either the true or the false branch. So nothing is annotated onto the arc. The statements of the true (S1) and false (S2) branches are annotated onto the true and false arcs 1510 and 1512, respectively. Case statements are handled in a similar way. The difference is that the conditions may include a default, and the number of branches can be greater than two. The default is the logical negation of the logical sum of all of the other conditions.

Loops in Verilog can take any of several forms. These are shown in FIGS. 16A–16D, along with corresponding control flow graph reductions. Additional parse trees may need to be constructed to make the loops operate correctly. In a repeat loop, a new variable, an iteration counter, is introduced. Its value must be initialized before entering the loop, and it's incremented each time the loop executes. In a "repeat . . . while" or "for . . . loop", a condition must be attached to each of the two out-arcs of the node labeled "Iter".

The reduction of the forever loop results T having no in-arc. This means that the control flow graph is syntactically incorrect after reduction of a forever loop. But this is a temporary condition that can be remedied by removing all arcs and nodes that are unreachable by a forward traversal from the reset node. Such pruning step is done after a control flow graph is completely reduced, e.g., all of the flow-of-control constructs of the HDL text have been reduced.

The reason pruning must be done at the end of reduction is that the Verilog disable statements can force an exit from a forever loop. Such an exit will (in Verilog) go to some successor node of T. The Verilog disable is, in effect, a jump to the end node of a labeled begin-end block. If a disable is annotated onto an arc A going from node S to node T, the disable is reduced by disconnecting A from T. The end node E, corresponding to the block being disabled, is looked up in a table that maps block names to corresponding end nodes. This table is constructed during a reduction of the labeled block. A's arrow end is connected to E. An event-control statement of the form "@ (posedge clock)" is reduced by adding a single node and labeling it a state. Statements that have no direct effect on flow of control, are not reduced, and are annotated onto their respective arcs.

Figure 17:
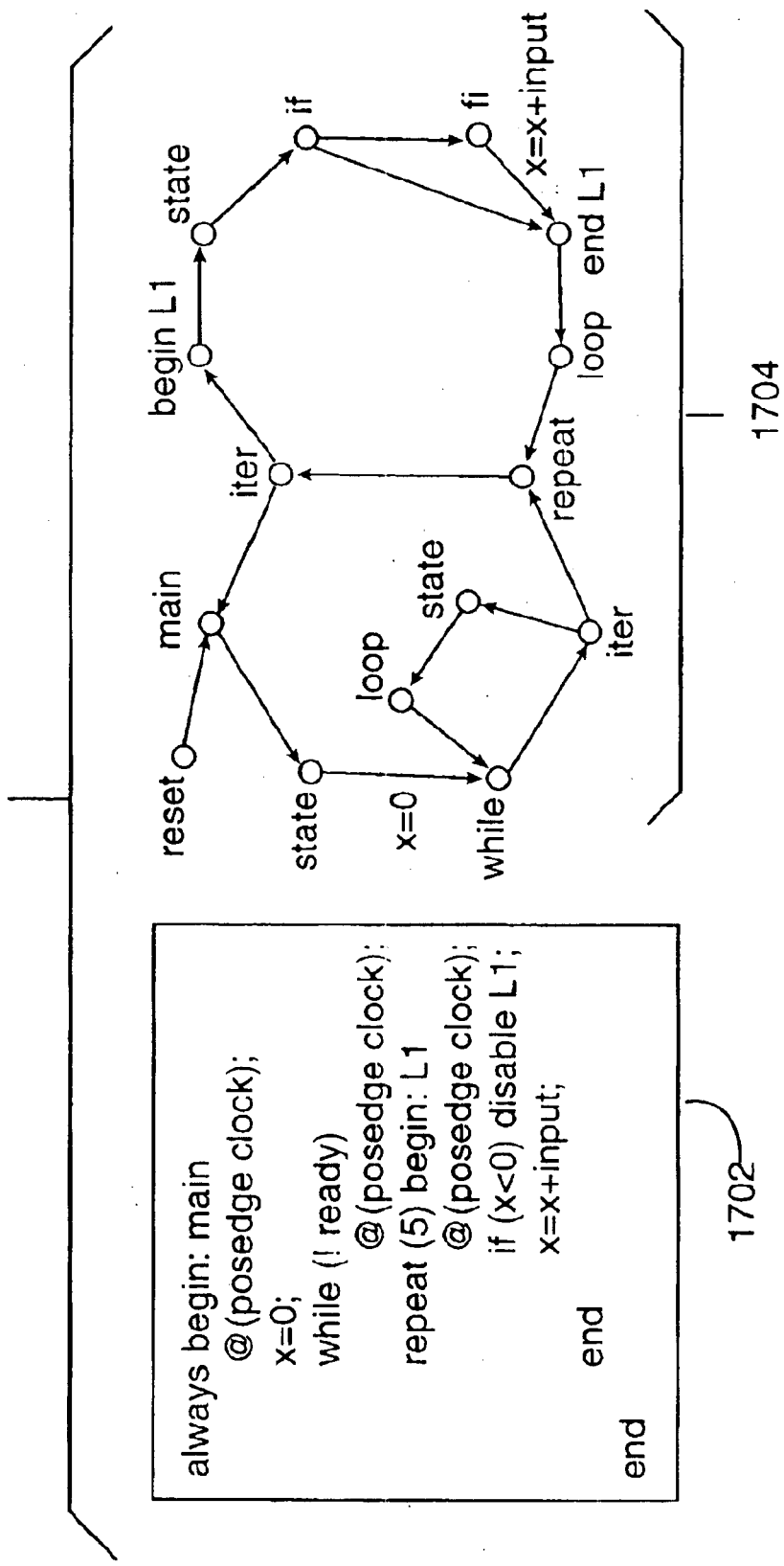
FIG. 17 is a diagram a simple Verilog HDL text suitable for high-level synthesis at the left, and a fully reduced control flow graph that corresponds to the text on the right.

An example of a simple Verilog HDL text 1702 suitable for high-level synthesis is shown at the left of FIG. 17. A fully reduced control flow graph 1704 that corresponds to the text is shown on the right. Once the graph 1704 has been fully constructed, some basic pruning is needed so the efficiency of later steps can be improved without changing the semantics of the graph. Any nodes and arcs that are unreachable from the reset node can be removed. Sets of arcs resulting from branches and having no further graph structure can be collapsed together, and conditional parse trees can be re-annotated onto the control flow graph. Graph structures include loops, states, and disables. Alternatively, the conditionals from which these sprang can be detected as having no effect on the control flow graph other than the creation of surplus branches. In such case the reduction is simply not applied, and the conditionals are annotated as they stand. Any dead branches whose conditions can never be true, can be removed, e.g., out-arcs of fork nodes. Simple nodes can be removed and their in-arcs and out-arcs merged, e.g., nodes with one in-arc and one out-arc that are not marked as states.

A one-hot FSM has its states coded with a unary code. All states are represented by binary numbers having all but one bit set false. Examples of a one-hot code include 0001, 0010, 0100, 1000. All but one of the bits are zero and the single "hot bit" is one. Such code can be inverted without loss of the one-hot property, e.g., 1110, 1101, 1011, 0111.

A one-hot FSM is extracted from a control flow graph by noting that each state node of the control flow graph can be mapped in a one-to-one way onto a single state flip-flop. A one-hot FSM is constructed with as many flip-flops as there are state nodes in the control flow graph. Each flip-flop "F" is assigned to one state node. When F's output is 1, we will infer that we are in the corresponding state.

A table MAP is constructed which maps arcs of the control flow graph to output ports of the FSM, and is a one-to-one mapping. As many output ports on the FSM as there are arcs in the control flow graph are constructed. The table MAP functions by mapping arcs onto output ports of the FSM. A location, MAP(A), maps a control flow graph arc A onto an output pin of the FSM. An inverse function, PAM, is used to map an output pin of the FSM to a corresponding control flow graph arc. A function FLOP maps a state node to a flip-flop.

Figure 18:
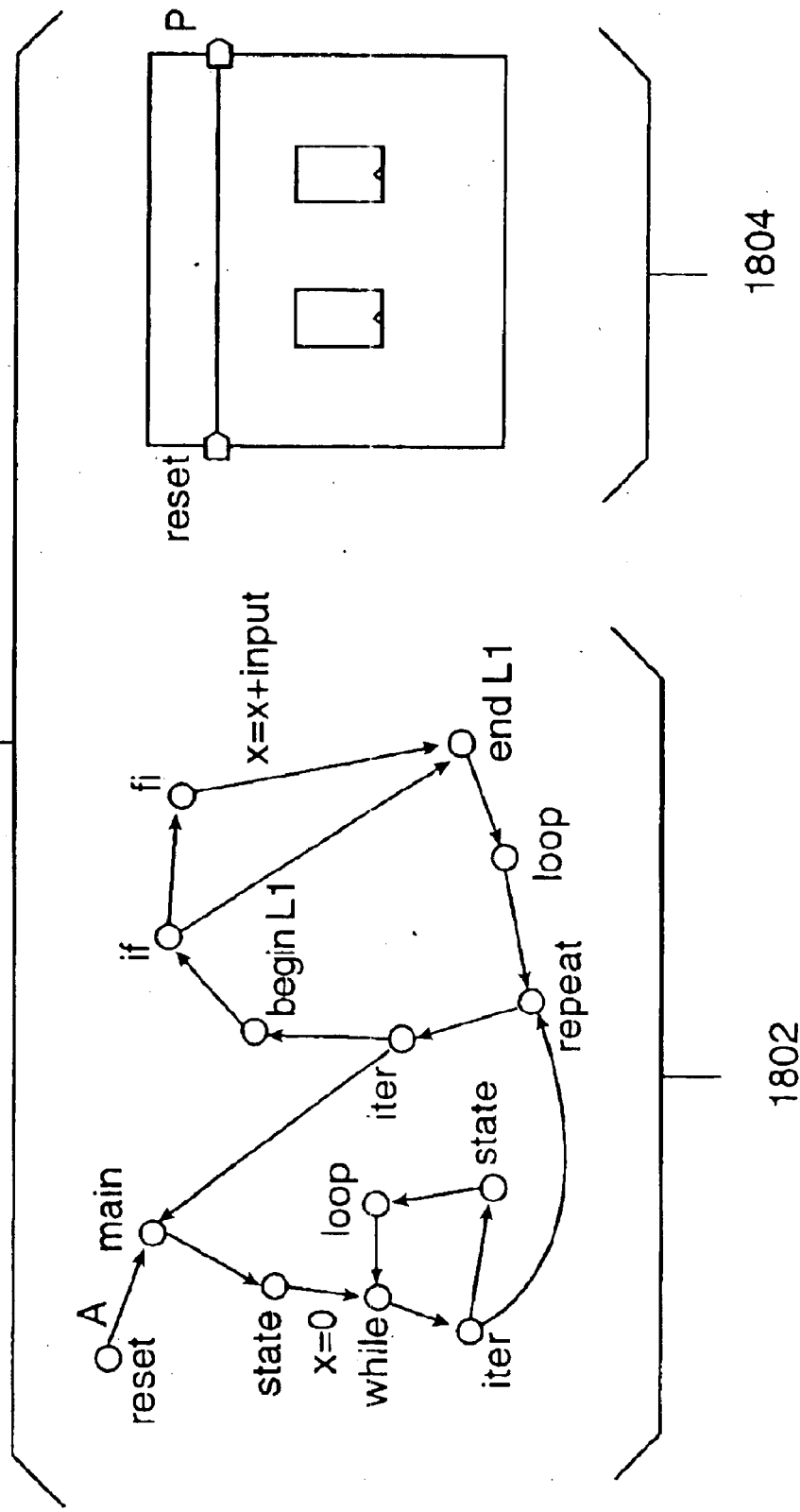
FIG. 18 is a diagram illustrating a procedure for building the function MAP.
Figure 19A:
FIGS. 19A–19D are diagrams that represent various piecewise constructions by which a complete one-hot FSM can be constructed by the procedure of Table I.
Figure 19B:
Figure 19C:
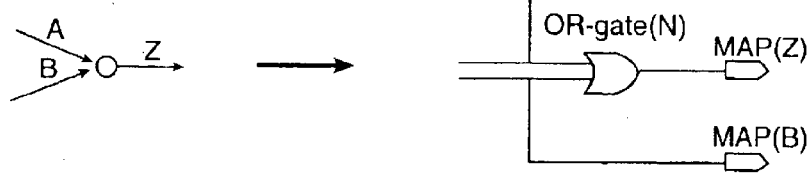
Figure 19D:
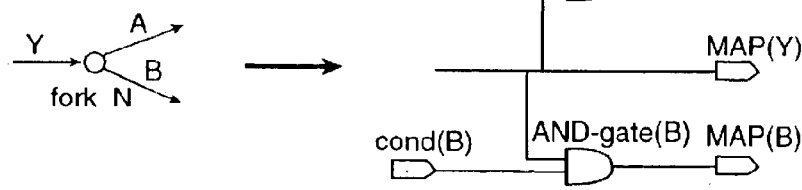

FIG. 18 helps illustrate a procedure for building the function MAP. A control flow graph 1802 is shown after mapping a reset arc to a FSM 1804. The out-arc of a reset node is assigned to an otherwise unassigned output pin P. An input pin named "reset" is constructed and connected directly to P. MAP(A) to P is set. All the state nodes of the control flow graph 1802 are considered next. Each has one in-arc and one out-arc, e.g., "C" and "D" for a state node "N". Node N is assigned to an unassigned flip-flop F, MAP(C) is assigned to the D-pin of F, and MAP(D) to the Q-pin of F. The FLOP(N) is set to F. This is repeated until all the state nodes are assigned. All in-arcs and out-arcs of state nodes and the reset are then in MAP.

The next step is to look at the arcs going into state nodes. Let C be such an arc. The MAP(C) is connected to the D-pin of a state flip-flop. A circuit is constructed that is driven by primary inputs and state flip-flops, and which drives MAP (C). A recursive procedure like that in Table I will build such a circuit.

Let MAP and PAM be two tables or functions. MAP maps an edge of the control-flow graph to a pin of the circuit. PAM maps a pin of the circuit to an edge of the control-flow graph. PAM is the inverse of MAP and MAP is the inverse of PAM, i.e. for any A, C, MAP(PAM(C))=C and PAM(MAP(A))=A.

FLOP is a table that maps state nodes of the control flow graph to flip-flops. For each state node there is exactly one flip-flop in FLOP; these flip-flops are unique, i.e. FLOP has as many entries as there are states in the control-flow graph.

The procedure OCT takes as its sole argument an arc C of the control-flow graph. CCT performs a recursive backward traversal of the control flow graph that builds me desired one-hot FSM as it traverses the control-flow graph, using only local information about the graph and the tables MAP, PAM, and FLOP.

CCT must be embedded in a loop that calls OCT once for each edge of the control-flow graph; this assures that all parts of the graph will be traversed.

A pseudocode description of the procedure CCT is shown here.

```
T = MAP(C);
If (T does not exist) {
    create a new output pin T;
    add the pair (C, T) to MAP and the pair (T, C) to PAM;
    N = {the node at the feather end of C}
    If (N is a state node) {
        Connect T to the Q pin of FLOP(N).
    }else if (N is a join node with K in-arcs) {
    Let G be a new K-input OR gate;
    Connect the output of G to T;
    for (each in-arc A of N) {
        Let P = MAP(A).
        If (P does not exist) {
            create a new output pin P;
            add the pair (A, P) to MAP and the pair (P, A) to PAM;
            call CCT(A);
        }
        Connect P to an unconnected input pin of G.
    }
    }else if (N is a fork node) {
        Let G be a new 2-input AND gate;
        Connect the output of G to T;
        Let A be the in-arc of N.
        Let P = MAP(A).
```

-continued

```
        If (P does not exist) {
            create a new output pin P;
            add the pair (A, P) to MAP and the pair (P, A) to PAM;
            call CCT(A);
        }
        Connect one input of G to P;
        Make the other input of G a primary status input corresponding
            to the branch condition that is annotated onto A.
    }else if (N is the reset node) {
        Connect T to the reset input.
    }else{
        Let A be the in-arc of N.
        Let P = MAP(A).
        if (P does not exist) {
            create a new output pin P;
            add the pair (A, P) to MAP and the pair (P, A) to PAM;
            call CCT(A);
        }
        Connect P to T.
    }
}else{
    /* Nothing need be done; C has been transversed already. */
}.-
```

TABLE I

Recursive Procedure

```
Procedure cct(c)
T = PAM(c);
    N = {the node at the feather end of C }
    If (N is a state node) {
        Connect T to the Q pin of FLOP(N).
    }else if (N is a join node with K in-arcs) {
        G = a new k-input OR gate
        Connect the output of G to T.
        for (each in-arc A of N) {
            Let P = MAP(A).
            If (P is null) {
                construct a new output pin named P.
                set MAP(A) = P.
                call cct(A).
            }
            connect P to an unconnected input pin of G.
        }
    }else if (N is a fork node) {
        Construct a new 2-input AND gate G.
        Connect the output of G to T.
        Let A be the in-arc of N.
        Let P = MAP(A).
        If (P is null) {
            Construct a new output pin named P.
            Set map(A) = P
            Call cct(A).
        }
        Connect one input of G to P
        Make the other input of G a primary status input
    Corresponding to the branch condition
            That is annotated onto A.
    }else if (N is the reset node) {
        Connect P to the reset input.
    }else{
        Let A be the in-arc of N.
        Let P = MAP(A).
        If (P is null) {
            Construct a new output pin named P.
            Set map(A) = P
            Call cct(A).
        }
        Connect P to T.
    }
end
```

FIGS. 19A–19D show the various piecewise constructions by which a complete one-hot FSM can be constructed by the procedure of Table I. The OR-gate and the flip-flop have been named after the nodes with which they are associated. The AND-gates are named after the arcs with which they are associated. The conditions associated with the branch arcs A and B are treated as primary inputs cond(A) and cond(B). All branch conditionals are assumed to be computed elsewhere.

Figure 20:
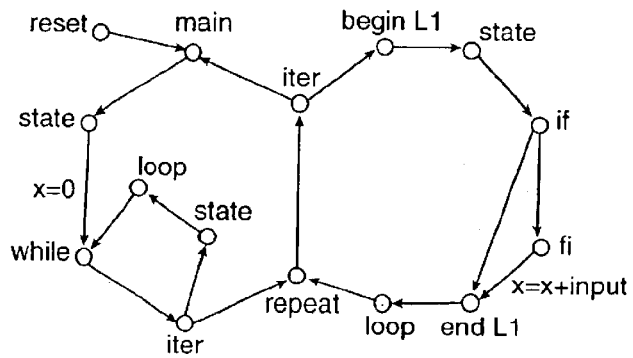
FIG. 20 is a diagram that shows the correspondence between a Verilog text sample, its control flow graph, and its ultimate one-hot FSM.
Figure 20:
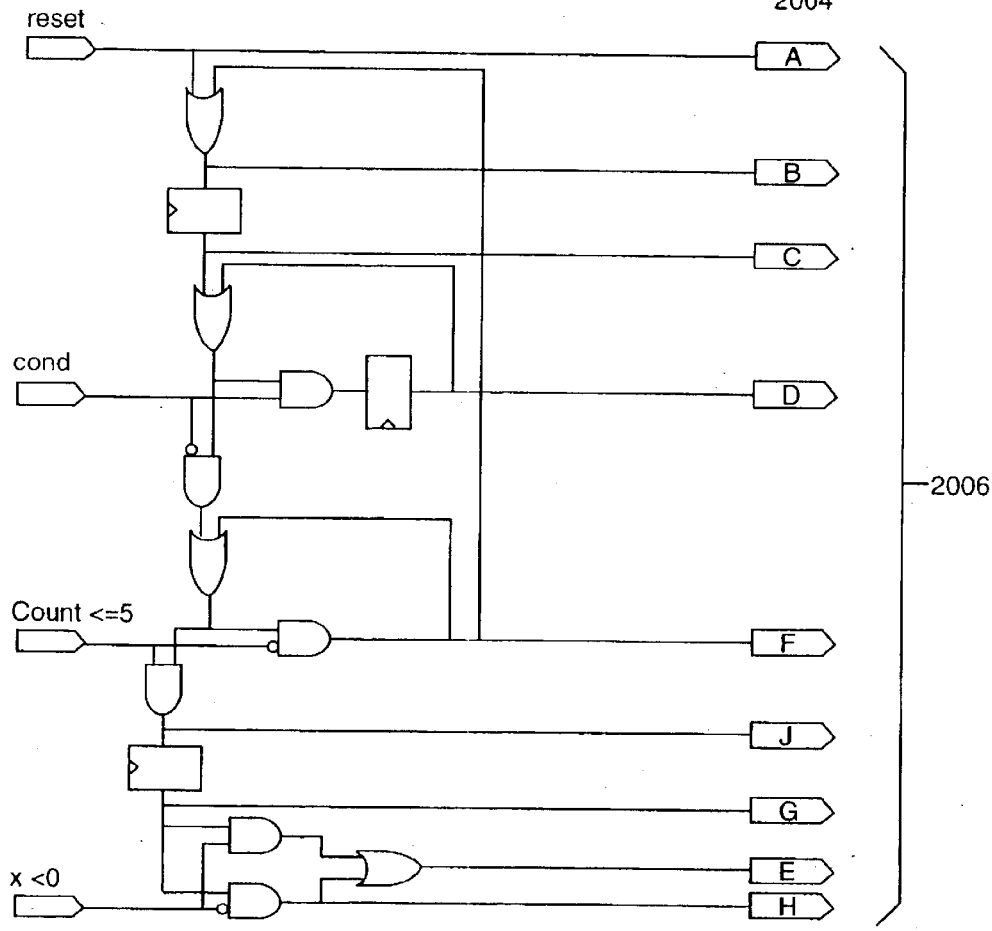

FIG. 20 shows a Verilog text sample 2002, along with its corresponding control flow graph 2004 and one-hot FSM 2006. The redundant outputs associated with arcs connected by simple, non-state, non-fork, non-join, non-reset, nodes have been collapsed. Some control outputs have been removed for clarity.

Several good general references have been published that would be helpful in constructing embodiments of the present invention. For example, De Micheli. *Synthesis and Optimization of Digital Circuits* McGraw-Hill 1994. Which covers scheduling, allocation, and other aspects of high-level and logic synthesis; B. Gregory et al. U.S. Pat. No. 5,661,661, register and latch inferencing, covers the use of an HDL and internal representation that is similar to the control-flow graph; D. Knapp and M. Winslett, *A Prescriptive Formal Model for Data-Path hardware*, IEEE Transactions on CAD, February 1992, pages 158–184, describes a representation for datapath and control hardware that is similar in structure and function to the control flow graph and which can be used for register inferencing, scheduling, and allocation, a necessary subset of the representation's main capability, which is to supply information necessary for correcting all of the above after a user or other agency has "broken" the design by manual editing; D. Knapp, *Synthesis from Partial Structure* in Design Methodologies for VLSI and Computer Architecture, D. A. Edwards, editor. Elsevier, 1989, describes a hardware-description language that is used to construct a control-flow graph similar to the one described here, which is also used for register inferencing, as well as the inference of other structural and behavioral information; D. Knapp and A. C. Parker, *A Unified Representation for Design Information* in Proceedings of CHDL-85, Elsevier, 1985, describes an early version of the control flow graph used here, along with other representations of the structure, behavior, and physical layout of a design.

Although the present invention is described herein with reference to the preferred embodiment, one skilled in the art will readily appreciate that other applications may be substituted for those set forth herein without departing from the spirit and scope of the present invention. Accordingly, the present invention should only be limited by the Claims included below.

What is claimed is:

1. A business-to-business application service provider with a software tool environment offered on a pay-per-use basis for system-on-a-chip designers to create unique intellectual property and providing an on-demand electronic design automation (EDA) computer program hosted on an Internet website, comprising the steps of:

generating an electronic circuit design;

partitioning said electronic circuit design into its constituent blocks and protocol design;

coding said constituent blocks and protocol design in hardware description language (HDL);

using high-level synthesis (HLS) for operation scheduling and resource allocation of said constituent blocks and protocol design;

technology-independent Boolean optimizing said constituent blocks after operation scheduling and resource allocation to produce an intermediate design;

technology-mapping said intermediate design to select particular devices for a hardware implementation of said electronic circuit design;

placing said particular devices at locations in a semiconductor chip; and routing a set of interconnections of said particular devices;

wherein, the stop of technology-mapping comprises the sub-steps of:

partitioning an original circuit design into a set of corresponding logic trees;

ordering said set of corresponding logic trees into an ordered linear list such that each tree-T that drives another ordered tree precedes said other ordered tree, and such that each ordered tree that drives said tree-T precedes said tree-T;

sweeping forward in said ordered linear list while computing a set of Pareto-optimal load/arrival curves for each of a plurality of net nodes that match a technology-library element; and sweeping backward in said ordered linear list while using said set of Pareto-optimal load/arrival curves for each of said net nodes and a capacitive load to select a best one of said technology-library elements with a shortest signal arrival time;

wherein, only net nodes that correspond to a gate input are considered, and any capacitive loads are predetermined.

2. A business-to-business application service provider with a software tool environment offered on a pay-per-use basis for system-on-a-chip designers to create unique intellectual property and providing an on-demand electronic design automation (EDA) computer program hosted on an Internet website, comprising the steps of:

partitioning an original circuit design into a set of corresponding logic trees replacing each said logic tre with an equivalent simplified tree having no interior nodes;

analyzing each path from a tree leaf to its root in said original circuit;

computing a propagation delay for each said path; and annotating computed delays onto corresponding arcs of said simplified trees.

3. The business-to-business application service provider of claim 2, wherein said electronic design automation (EDA) computer program further provides for:

annotating any dependency of a propagation delay of said original circuit design on a slew rate of an input signal onto a corresponding leaf of said simplified tree.

4. The business-to-business application service provider of claim 2, wherein said electronic design automation (EDA) computer program further provides for:

copying any capacitive load values from any leaves of said logic tree to corresponding leaves of said simplified tree.

5. The business-to-business application service provider of claim 2, wherein said electronic design automation (EDA) computer program further provides for:

copying a load/d lay response curve of an output gate at an apex of said logic tree, to a root of said simplified tree.

6. The business-to-business application service provider of claim 2, wherein said electronic design automation (EDA) computer program further provides for:

collapsing an entire delay calculation into a simple edge-weighted longest-path traversal within an interior of an abstract timing model of a resource.

7. The business-to-business application service provider of claim 2, wherein said electronic design automation (EDA) computer program further provides for:

calculating timing delays for an electronic design with a combination of complex-model trees that Interface circuit boundaries and simple a model trees that are internal and do not interface with circuit boundaries.

8. The business-to-business application service provider of claim 2, wherein said electronic design automation (EDA) computer program further provides a technology selection process comprising the steps of:

partitioning an original circuit design into a set of corresponding logic trees;

ordering said set of corresponding logic trees into an ordered linear list such that each tree-T that drives another ordered tree precedes said other ordered tree, and such that each ordered tree that drives said tree-T precedes said tree-T;

sweeping forward in said ordered linear list while computing a set of Pareto-optimal load/arrival curves for each of a plurality of net nodes that match a technology-library element; and sweeping backward in said ordered linear list while using said set of Pareto-optimal load/arrival curves for each of said net nodes and a capacitive load to select a best one of said technology-library elements with a shortest signal arrival time;

wherein, only net nodes that correspond to a gale input are considered, and any capacitive loads are predetermined.

9. The business-to-business application service provider of claim 2, wherein said electronic design automation (EDA) computer program further provides for:

generating an electronic circuit design;

partitioning said electronic circuit design into its constituent blocks and protocol design;

coding said constituent blocks and protocol design in hardware description language (HDL);

using high-level synthesis (HLS) for operation scheduling and resource allocation of said constituent blocks and protocol design;

technology-independent Boolean optimizing said constituent blocks after operation scheduling and resource allocation to produce an intermediate design;

technology-mapping said intermediate design to select particular devices for a hardware implementation of said electronic circuit design;

placing said particular devices at locations in a semiconductor chip; and routing a set of interconnections of said particular devices;

wherein, the step of technology-mapping comprises the sub-steps of:

partitioning an original circuit design into a set of corresponding logic trees;

ordering said set of corresponding logic trees into an ordered linear list such that each tree-T that drives another ordered tree precedes said other ordered tree, and such that each ordered tree that drives said tree-T precedes said tree-T;

sweeping forward in said ordered linear list while computing a set of Pareto-optimal load/arrival curves for each of a plurality of net nodes that match a technology-library element; and sweeping backward in said ordered linear list while using said set of Pareto-optimal load/arrival curves for each of said net nodes and a capacitive load to select a best one of said technology-library elements with a shortest signal arrival time;

wherein, only net nodes that correspond to a gate input are considered, and any capacitive loads are predetermined.

10. The business-to-business application service provider of claim 9, wherein:

the step of using high-level synthesis is such that a timing analysis is applied each time an individual operation is scheduled, and may called many times to gel a single operation scheduled.

11. The business-to-business application service provider of claim 9, wherein:

the step of technology mapping maps abstract Boolean gates of said electronic circuit design to standard cells from a technology library.

12. The business-to-business application service provider of claim 2, wherein said electronic design automation (EDA) computer program further provides for transforming a hardware-description language text representing a sequential program into a control-flow graph for later operation scheduling and technology allocation by:

reducing a hardware-description language text representing a sequential program into a control-flow graph;

constructing a one-hot-bit finite state machine from said control-flow graph; and predicting an operational timing of said one-ho-bit finite state machine before operation scheduling in an electronic design automation system;

wherein, a cycle-by-cycle timing congruence is maintained between said hardware-description language text and a final synthesized design.

13. The business-to-business application service provider of claim 12, wherein:

the reducing comprises a step-by-step reduction of a parse tree; wherein, particular parse tree structures are recognized and corresponding subgraphs are constructed.

14. The business-to-business application service provider of claim 13, wherein: the reducing begins with the construction of a simple graph having a reset node and a join node with a trivial self-loop; wherein an "always" construct is implemented.

15. The business-to-business application service provider of claim 14, wherein:

the reducing continues by transforming said simple graph into a more elaborate control-flow graph by applying a procedure to any parse-tree statements annotated onto any arcs;

wherein an arc that has a statement is removed and replaced with at least two new arcs and at least one new node.

16. The business-to-business application service provider of claim 15 wherein: the reducing continues by applying said procedure recursively to all said parse-tree statements annotated onto all said arcs;

wherein all decomposable statements are processed.

17. The busin ss-to-business application service provider of claim 16, wherein:

the reducing continues by saving a name of any labeled block in a table that maps such name to a node "end";

wherein said node "end" provides a destination for any Verilog "disable" statements.

18. The business-to-business application service provider of claim 16, wherein:

the reducing continues by Introducing an iteration-counter variable in a case of a "repeat" loop;

wherein said iteration-counter variable is initialized before entering said loop and is incremented each time said loop rolls around.

19. The business-to-business application service provider of claim 16, wherein:

the reducing continues by attaching a condition to each of two out-arcs of a new node "iter" for a "repeat" loop, a "while" loop, or a "form" loop.

20. The business-to-business application service provider of claim 16, wherein:

the reducing continues by removing any arcs and nodes that are unreachable by a forward transversal from a "reset" node.

21. The business-to-business application service provider of claim 16, wherein:

the reducing continues by collapsing together any sets of arcs resulting from branches containing no further graph structure and re-annotating any conditional parse trees onto said control-flow graph.

22. The business-to-business application service provider of claim 16, wherein:

the reducing continues by detecting if any conditionals have no effect on said control-flow graph other than a creation of a surplus branch, and if so not applying a reduction and annotating said conditionals as they are.

23. The business-to-business application service provider of claim 16, wherein:

the reducing continues by removing any dead branches whose conditions can never be true.

24. The business-to-business application service provider of claim 16, wherein:

the reducing continues by merging the in-arcs and out-arcs of simple nodes with one in-arc and one out-arc that are not marked as states.

25. The business-to-business application service provider of claim 16, further including:

pruning of said control-flow graph after the step of reducing to accommodate a Verilog "disable" statement in said hardware-description language text.

26. The business-to-business application service provider of claim 16, further including:

the pruning of said control-flow graph after the step of reducing to accommodate a "goto" statement in said hardware-description language text.

27. The business-to-business application service provider of claim 15, wherein:

the step of constructing said one-hot-bit finite state machine continues by constructing a table MAP;
wherein any arcs of said control-flow graph are mapped to a corresponding output port of said finite state machine, wherein MAP and PAM are two tables or functions and MAP mass an edge of the control-flow graph to a pin of the circuit and PAM maps a pin of the circuit to an edge of the control-flow graph, PAM being the inverse of MAP and MAP is the inverse of PAM.

28. The business-to-business application service provider of claim 27, wherein:

the step of constructing said one-hot-bit finite state machine continues by building a circuit which is driven by a set of primary inputs and state flip-flops, and and which drives a MAP(C); wherein MAP and PAM are two tables or functions
MAP maps an edge of the control-flow graph to a pin of the circuit and PAM maps a pin of the circuit to an edge of the control-flow graph, PAM being the inverse of MAP and MAP is the inverse of PAM.

29. The business-to-business application service provider of claim 28, wherein:

the step of constructing said one-hot-bit finite state machine includes using a procedure approximated by,
Procedure cct(c)

```
T = PAM(c);
N = {the node at the feather end of C}
if (N is a state node) {
    Connect T to the Q pin of FLOP(N).
} else if (N is a join node with K in-arcs) {
    G = a new k-input OR gate
    Connect the output of G to T.
    for (each in-arc A of N) {
        Let P = MAP(A).
        If (P is null) {
            construct a new output pin named P.
            set MAP(A) = P.
            call cct(A).}
        connect P to an unconnected input pin of G.}
} else if (N is a fork node) {
    Construct a new 2-input AND gate G.
    Connect the output of G to T.
    Let A be the in-arc of N.
    Let P = MAP(A).
    If (P is null) {
        Construct a new output pin named P.
        Set map(A) = P
        Call cct(A).
    }
    Connect one input of G to P
    Make the other input of G a primary status input
    Corresponding to the branch condition
        That is annotated onto A.
} else if (N is the reset node) {
    Connect P to the reset input.
}else{
    Let A be the in-arc of N.
    Let P = MAP(A).
    If (P is null) {
        Construct a new output pin named P.
        Set map(A) = P
        Call cct(A).
    }
    Connect P to T.
}
end;
``` wherein MAP and PAM are two tables or functions and
MAP maps an edge of the control-flow graph to a pit of the circuit and PAM maps a pin of the circuit to an edge of the control-flow graph, PAM being the inverse of MAP and MAP is the inverse of PAM; and
wherein the procedure CCT takes as its sole argument an arc C of the control-flow graph and performs a recursive backward traversal of the control flow graph that builds the desired one-hot FSM as it traverser the control-flow graph, using only local information about the graph and the tables MAP, PAM, and FLOP.

30. The business-to-business application service provider of claim 12, wherein:

the step of constructing said one-hot-bit finite state machine includes mapping each state node of said control-flow graph to a corresponding single-state flip-flop;
wherein, a respective state is indicated when any flip-flop output is true.

* * * * *